(12) United States Patent
Nishide et al.

(10) Patent No.: US 6,364,058 B1
(45) Date of Patent: Apr. 2, 2002

(54) LUBRICANT SUPPLY DEVICE

(75) Inventors: Tetsuhiro Nishide; Mieko Fujitsuna; Mitsuaki Honma, all of Yamanashi-ken (JP)

(73) Assignee: THK Co., Ltd., Tokyo-to (JP)

( * ) Notice: Subject to any disclaimer, the term of this patent is extended or adjusted under 35 U.S.C. 154(b) by 0 days.

(21) Appl. No.: 09/512,677

(22) Filed: Feb. 25, 2000

(30) Foreign Application Priority Data

Feb. 26, 1999 (JP) .......................................... 11-050922

(51) Int. Cl.[7] .............................................. F16C 17/00
(52) U.S. Cl. ........................ 184/5; 74/89.44; 74/424.84
(58) Field of Search ........................... 184/5, 100, 102; 74/89.44, 89.4, 424.84; 384/13

(56) References Cited

U.S. PATENT DOCUMENTS

| | | | | |
|---|---|---|---|---|
| 2,757,548 A | * | 8/1956 | Smith et al. ................ | 74/89.44 |
| 3,404,582 A | * | 10/1968 | Sodergard et al. .......... | 74/89.44 |
| 3,499,624 A | * | 3/1970 | Custer ........................ | 74/89.44 |
| 4,000,664 A | * | 1/1977 | Christensen ................ | 74/89.44 |
| 4,005,913 A | * | 2/1977 | Thomson, Jr. ............... | 184/5 |
| 4,407,511 A | * | 10/1983 | Benton et al. .............. | 74/459 |
| 4,905,533 A | * | 3/1990 | Benton et al. .............. | 74/459 |
| 5,454,278 A | * | 10/1995 | Kasuga ....................... | 184/5 |
| 5,555,771 A | * | 9/1996 | Kuroiwa et al. ............ | 74/459 |
| 5,678,927 A | * | 10/1997 | Yabe et al. ................. | 384/13 |
| 5,695,288 A | * | 12/1997 | Sugihara et al. ........... | 384/13 |
| 5,809,838 A | * | 9/1998 | Miyaguchi et al. ......... | 74/89.44 |
| 6,082,899 A | * | 7/2000 | Suzuki et al. .............. | 384/13 |
| 6,123,457 A | * | 9/2000 | Suzuki et al. .............. | 384/13 |
| 6,125,968 A | * | 10/2000 | Shirai ........................ | 184/102 |
| 6,135,638 A | * | 10/2000 | Agari ......................... | 384/13 |
| 6,176,617 B1 | * | 1/2001 | Kamimura et al. .......... | 384/13 |
| 6,190,046 B1 | * | 2/2001 | Agari ......................... | 384/13 |

* cited by examiner

*Primary Examiner*—David A. Bucci
*Assistant Examiner*—Chong H. Kim
(74) *Attorney, Agent, or Firm*—Young & Thompson

(57) ABSTRACT

A lubricant supply device is to be fitted to a nut member engaging with a screw shaft through rolling members to supply lubricant to the screw shaft along with a relative rotational motion of the nut member to the screw shaft. The device comprises an application member, a lubricant storage member and a control device. The application member for applying the lubricant on the screw shaft has at least one tongue portion, which is capable of coming into contact with at least one of rolling-member running surface of the screw shaft. The number of the at least one tongue portion is identical with or larger than the number of the rolling-member running surface. The lubricant storage member supplies the lubricant to the application member. The control device controls an amount of the lubricant supplied from the lubricant storage member to the application member.

5 Claims, 5 Drawing Sheets

LUBRICANT SUPPLY DEVICE

BACKGROUND OF THE INVENTION

1. Field of the Invention

The present invention relates to a lubricant supply device for supplying lubricant to a screw shaft of a rolling-member screw apparatus such as a ball screw.

2. Description of the Related Art

A rolling-member screw apparatus such as a linear motion rolling guide apparatus and a ball screw apparatus is known as a linear motion apparatus in which a sliding member can move relative to a track shaft through rolling members such as balls that are disposed between them.

The linear motion rolling guide apparatus can guide a movable member such as a table on a stationary member such as a bed or a saddle. The linear motion rolling guide apparatus comprises a guide rail, a movable block and a plurality of balls. The guide rail is mounted on the stationary member and has ball running grooves formed thereon, which extend in the longitudinal direction of the guide rail so as to serve as rolling-member running surfaces. The movable block has ball circulation passages formed therein, which include loaded ball running grooves serving as loaded rolling-member running surfaces corresponding to the ball running grooves of the guide rail. The movable block is fitted to the guide rail so as to be capable of making a relative motion of the former to the latter. The balls are received in the ball circulation passages in the form of trains so as to serve as the rolling members that can be circulated along with the relative motion of the movable block to the guide rail. A linear motion of the movable block supporting the movable member can be made along the guide rail along with the endless circulation of the balls.

The applicant has proposed a lubricant supply device for lubricating the guide rail of the above-described linear motion rolling guide apparatus in Japanese Patent Application No. H9-305,861. The lubricant supply device comprises a casing, an application member, an absorbent body and an oil supply adjusting plate. The casing is mounted on a sliding member. The application member is received in the casing so as to come into contact with the guide rail to apply lubricant on the guide rail. The absorbent body is received together with the application member in the casing so as to supply the lubricant to the application member. The oil supply adjusting plate locates between the absorbent body and the application member so as to supply the absorbent body to the application member.

When the sliding member moves on the guide rail, the lubricant is applied from the application member to the guide rail. When an amount of lubricant absorbed by the application member is gradually decreased, the lubricant absorbed by the absorbent body is supplied through the oil supply adjusting plate to the application member by capillary action. Accordingly, a prescribed amount of lubricant is always absorbed by the application member, thus making it possible to stably supply a prescribed amount of lubricant to be applied on the guide rail from the application member.

The rolling-member screw apparatus such as a ball screw falls under the category of the linear motion apparatus, like the above-described linear motion rolling guide apparatus. However, the rolling-member screw apparatus has specific structures that the track shaft is formed into a screw shaft provided with a rolling-member running groove having a spiral shape, the sliding member is formed into a nut member, which engages with the screw shaft and has on its inner peripheral surface a rolling-member running groove having a spiral shape, corresponds to the rolling-member running groove of the screw shaft, and rolling members such as balls run in the spiral rolling-member running groove along with the relative rotation of the screw shaft to the nut member so that the relative linear motion of the nut member to the screw shaft can be made.

There has conventionally been a demand for development of the lubricant supply device, which is the most suitable for the rolling-member screw apparatus having the above-mentioned specific structures. However, such a lubricant supply device has not as yet been developed.

SUMMARY OF THE INVENTION

An object of the present invention is therefore to provide a lubricant supply device, which is suitable for the rolling-member screw apparatus having the specific structures.

In order to attain the aforementioned object, a lubricant supply device of the present invention, which is to be fitted to a nut member engaging with a screw shaft through rolling members to supply lubricant to said screw shaft along with a relative rotational motion of said nut member to said screw shaft and comprises:

- an application member for applying the lubricant on said screw shaft, said application member having at least one tongue portion, which is capable of coming into contact with at least one of rolling-member running surface of said screw shaft, a number of said at least one tongue portion being identical with or larger than a number of said rolling-member running surface;
- a lubricant storage member for supplying the lubricant to said application member; and
- a control device for controlling an amount of the lubricant supplied from said lubricant storage member to said application member.

According to the first device of the present invention described above, the relative rotation of the screw shaft to the nut member is made so that the lubricant is applied from the tongue portion of the application member on the surface of the rolling-member running surface of the screw shaft. The control device controls an amount of lubricant supplied from the lubricant storage member to the application member. Consequently, there is no serious change in an amount of lubricant supplied from the lubricant storage member to the application member even after a lapse of time so that a prescribed amount of lubricant can always be applied from the application member on the screw shaft. It is therefore possible to apply a minimum amount of lubricant on the screw shaft for a long period of time.

The tongue portion of the first device of the present invention, which is mounted on the nut member, can move along the spiral rolling-member-running surface along with the relative rotation of the nut member to the screw shaft. The number of the tongue portion is identical with or larger than the number of the rolling-member running surface. Accordingly, the spiral rolling-member running surface of the screw shaft can be lubricated over its entire length, irrespective of the number of the rolling-member running surface.

As the application member, there may be used material, which can smoothly apply the lubricant absorbed therein on the screw shaft, for example, oil absorbent material, which is formed of fiber-entangled body such as felt, or of sintered resin. The oil absorbent material preferably has a lower porosity than that of the other absorbent body described below, which serves as the lubricant storage member.

With respect to the lubricant storage member, any structural component, which can preserve in its inside a large amount of lubricant supplied to the application member, may suffice. As the lubricant storage member, there may be used for example either a tank having in its inside a storage chamber for receiving the lubricant, or oil absorbent material including fiber-entangled body such as felt, sintered resin or sponge by which the lubricant is actually absorbed. The oil absorbent material preferably has a higher porosity than that of the absorbent body described above, which serves as the application member.

With respect to the control device, any structural component, which can control an amount of lubricant supplied from the lubricant storage member to the application member, may suffice. As the control device, there may be used for example oil absorbent material, which is formed of fiber-entangled body such as felt, or of sintered resin. The oil absorbent material preferably has a porosity, which is middle between the high porosity of the oil absorbent material for the application member and the low porosity of the oil absorbent material for the lubricant storage member. As the control device, there may be used an oil supply adjusting plate, which can be obtained by forming supply holes through which the lubricant can passes, on a thin plate separating the lubricant storage member and the application member from each other.

There may be adopted a structure that a plurality of tongue portions are provided as said at least one tongue portion, said plurality of tongue portions locating along a single straight line, which is in parallel with a central axial line of said screw shaft. According to such a structure, it is possible to collect the lubricant supplied from the lubricant storage member in the single place, irrespective of the number of the rolling member running surface, so as to apply effectively the lubricant on the rolling-member running surface. When the rolling-member screw apparatus especially has the stationary nut member, the arrangement of the tongue portions in the lower position of the lubricant storage member causes the lubricant to gather in the single lower place under the gravity of the lubricant, thus providing more effective results.

In order to attain the above-mentioned object, the second lubricant supply device of the present invention, which is to be fitted to a nut member engaging with a screw shaft through rolling members to supply lubricant to said screw shaft along with a relative rotational motion of said nut member to said screw shaft and comprises:

an application member for applying the lubricant on said screw shaft, said application member having at least one tongue portion, which is capable of coming into contact with at least one of rolling-member running surface of said screw shaft, said at least one tongue portion locating on a single straight line, which is in parallel with a central axial line of said screw shaft;

a lubricant storage member for supplying the lubricant to said application member; and a control device for controlling an amount of the lubricant supplied from said lubricant storage member to said application member.

According to the second device described above of the present invention, the relative rotation of the screw shaft to the nut member is made so that the lubricant is applied from the tongue portion of the application member on the surface of the rolling-member running surface of the screw shaft. Since the tongue portion locates on the single straight line, which is in parallel with the central axial line of the screw shaft, it is possible to collect the lubricant supplied from the lubricant storage member in the single place corresponding to the above-mentioned single straight line so as to apply effectively the lubricant on the rolling-member running surface. When the rolling-member screw apparatus especially has the stationary nut member, the arrangement of the tongue portions in the lower position of the lubricant storage member causes the lubricant to gather in the single lower place, thus providing more effective results.

In the second device of the present invention, the number of said at least one tongue portion may be identical with or larger than the number of said at least one rolling-member running surface, and a plurality of tongue portions may be provided as said at least one tongue portion, said plurality of tongue portions locating along a single straight line, which is in parallel with a central axial line of said screw shaft. According to the second device of the present invention, the spiral rolling-member running surface of the screw shaft can be lubricated over its entire length, irrespective of the number of the rolling-member running surface, due to the feature that the number of the tongue portion may be identical with or larger than the number of one rolling-member running surface.

In the first and second devices of the present invention, there may be adopted a structure that said lubricant storage member is formed into a tubular shape so that said screw shaft can be inserted in said lubricant storage member without causing restriction of the motion of said screw shaft; said lubricant storage member has a slit, which is separated from an inside of said lubricant storage member, said slit opening toward said screw shaft and extending along a single straight line, which is in parallel with a central axial line of said screw shaft; and said application member is fitted into said slit.

According to such a structure, the application member is fitted into the slit formed in the lubricant storage member, and it is possible to collect the lubricant received in the lubricant storage member in the single place so as to supply effectively the lubricant to the application member. The device itself can be manufactured in a small size in accordance with the size of the nut member. The lubricant storage member has a relatively large capacity by which a large amount of lubricant can be received in it.

In the first and second devices of the present invention, there may be adopted a structure that the inside of the lubricant storage member communicates with said slit at an end thereof in a longitudinal direction; said application member is formed of oil absorbent material, which can absorb the lubricant to preserve the same, into a plate-shape, said application member being fitted into said slit so as not to come into contact with the inside of said lubricant storage member; said control device comprises a joint member, which is formed of the oil absorbent material to absorb the lubricant to carry the same, said joint member comprising a main body, which comes into contact with said application member at said one end of said slit, but does not come into contact with the inside of said lubricant storage member, and elongated portions, which extend from said main body to reach the inside of said lubricant storage member.

According to such a structure, the lubricant absorbed by the application member is applied on the surface of the rolling-member running surface of the screw shaft, while the lubricant preserved in the lubricant storage member is supplied to the application member through the elongated portions and the main body of the joint member.

The joint member is fitted into the slit formed in the lubricant storage member, and it is possible to collect the lubricant received in the lubricant storage member in the single place so as to supply effectively the lubricant to the joint member. The application member, which is formed into a plate-shape, and the main body of the joint member are fitted into the slit, which is formed in the lubricant storage member so as to open at its one end, so as to make the maximum use of the limited space. As a result, it is possible to manufacture the lubricant supply device in a smaller size.

The optimum determination of the shapes of the elongated portions and the main body of the joint member, a contact area of the elongated portions with the inside of the lubricant storage member and the contact area of the main body with the application member makes it possible to supply the lubricant from the lubricant storage member to the application member in a properly controlled manner.

In the first and second devices of the present invention, there may be adopted a structure that said lubricant storage member has a occlusion member received therein, which is formed of the oil absorbent material so as to absorb the lubricant to preserve the same; and porosities of the oil absorbent materials of said occlusion member, said joint member and said application member are determined to be larger in this order.

According to such a structure, it is possible to preserve an amount of lubricant, which is required to be applied, in the application member and impart strength, which is sufficient to bear the contact slide with the rolling-member running surface, to the application member. Use of the oil absorbent material having a high porosity as the occlusion member makes it possible to ensure the sufficient amount of lubricant preserved therein. When the fiber-entangle body, which can cause capillary action, is used as material for forming the occlusion member, the joint member and the application member, sucking force caused by the capillary action becomes larger in this order. Accordingly, no congestion of the lubricant in the passage therefor occurs, thus providing smooth supply of the lubricant.

DETAILED DESCRIPTION OF THE PREFERRED EMBODIMENTS

Now, embodiments of a lubricant supply device of the present invention will be described in detail below with reference to the accompanying drawings.

Figure 1:
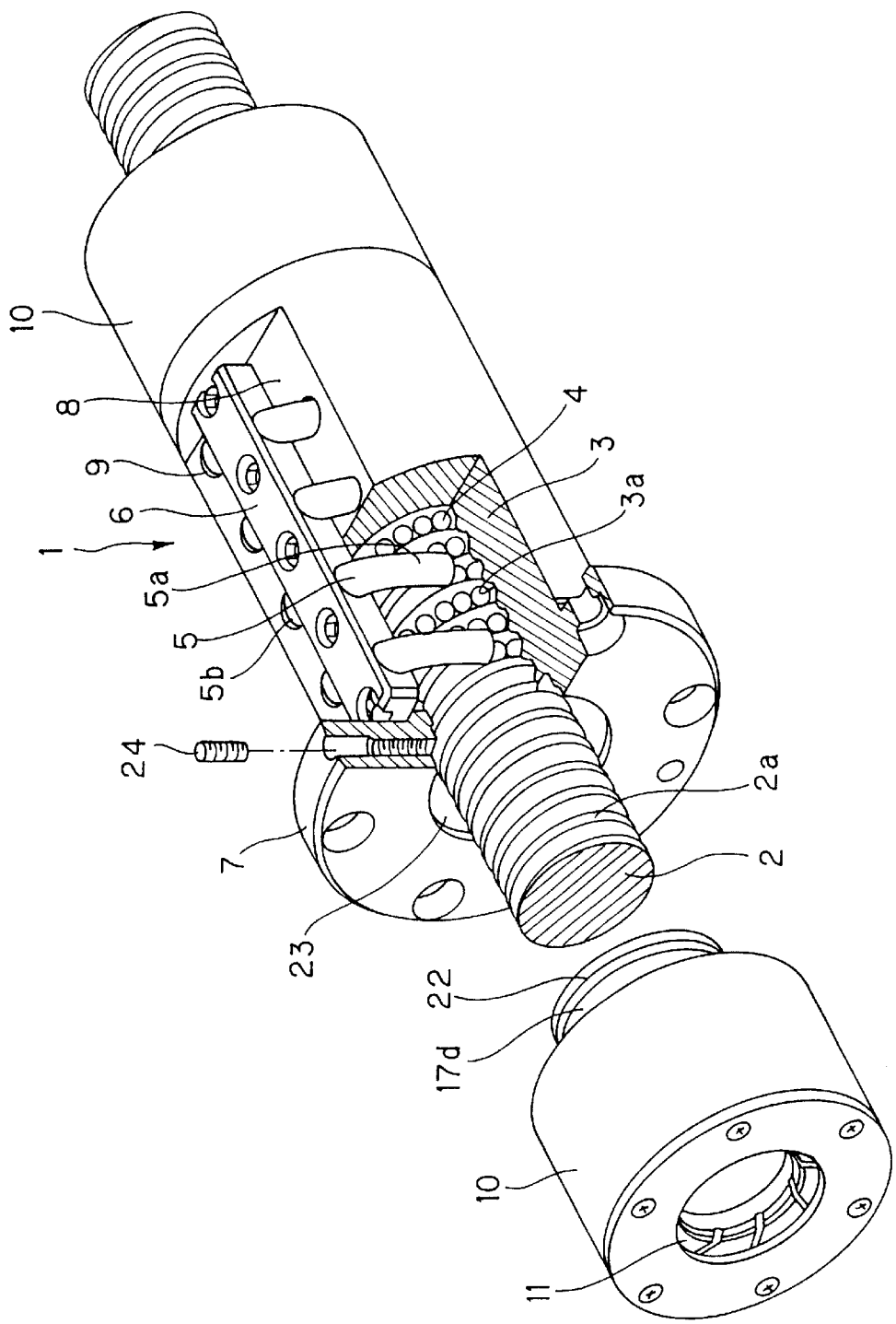
FIG. 1 is a perspective view illustrating a ball screw into which a lubricant supply device of the first embodiment of the present invention is incorporated.

FIG. 1 is a perspective view illustrating a ball screw (i.e., a rolling member screw apparatus) into which a lubricant supply device of the first embodiment of the present invention is incorporated. The ball screw 1 comprises a screw shaft 2 (i.e., a track shaft), a nut member 3 and a plurality of balls 4 . . . 4. The screw shaft 2 has on its outer peripheral surface a spiral ball running groove 2a serving as a rolling member running surface. The nut member 3 has on its inner peripheral surface a ball circulation passage (i.e., a rolling member circulation passage), which includes a spiral loaded ball running groove 3a serving as a loaded rolling member running surface so as to correspond to the spiral ball running groove 2a of the screw shaft 2. The nut member 3 engages with the screw shaft 2 so as to be capable of making a relative motion of the former relative to the latter. The balls 4 . . . 4 are received in the ball circulation passage in the form of trains so as to serve as rolling members that can be circulated along with the relative (rotational) motion of the nut member 3 to the screw shaft 2. The loaded ball running passage of the above-mentioned ball circulation passage is formed between the ball running groove 2a of the screw shaft 2 and the loaded ball running groove 3a of the nut member 3. The nut member 3 has four return pipes 5 . . . The return pipes 5 . . . 5 form a non-loaded return passage, which connects one end with the other end of the loaded ball running passage mentioned above. The both ends of each of the return pipes 5 . . . 5 are fitted into holes formed in the main body of the nut member 3. The return pipes 5 . . . are separated from each other by a few pitches of the screw shaft 2 in its longitudinal direction. The return pipes 5 . . . 5 are held on the main body of the nut member 3 by means of a pipe retainer 6.

The ball running groove 2a is formed on the screw shaft 2 by a grinding or form rolling method so as to reveal an arcuate cross section.

The main body of the nut member 3 is formed into a tubular shape and has at its one end a flange portion 7 to which a counterpart is to be connected. The main body of the nut member 3 has a flat portion 8, which is formed by subjecting a prescribed portion on the peripheral surface of the main body to a machinery cut. The flat portion 8 has eight return pipe-fitting holes 9 . . . 9 into which the ends of the return pipes 5 . . . 5 are fitted. The return pipe-fitting holes 9 . . . 9 extend to reach the loaded ball running groove 3a.

When the screw shaft 2 rotates, the tip ends of leg portions of the return pipes 5 . . . 5 scoop up the balls which roll in the ball running groove 2a under loaded condition. The scooped balls 4 . . . 4 pass through the return pipe 5. The balls 4 . . . are returned into the ball running groove 2a from the leg portion 5b of the other return pipe 5, which is separated from the above-mention ed return pipe 5 by a few pitches of the screw shaft 2. When the screw shaft 2 rotates in the opposite direction, the balls 4 . . . 4 circulate through an reverse route. The circulation of the balls 4 . . . 4 is also made, when the nut member 3 rotates relative to the screw shaft 2 serving as the stationary member.

The lubricant supply device 10 for supplying the lubricant to the screw shaft 2 is mounted to the opposite ends of the nut member 3. The lubricant supply device 10 rotates together with the nut member 3 relative to the screw shaft 2 to apply the lubricant on the ball running surface of the screw shaft 2. The lubricant supply device 10 is provided with a wiper ring 11 for discharging foreign substances outside, which are attached on the surface of the screw shaft 2.

Figure 2:
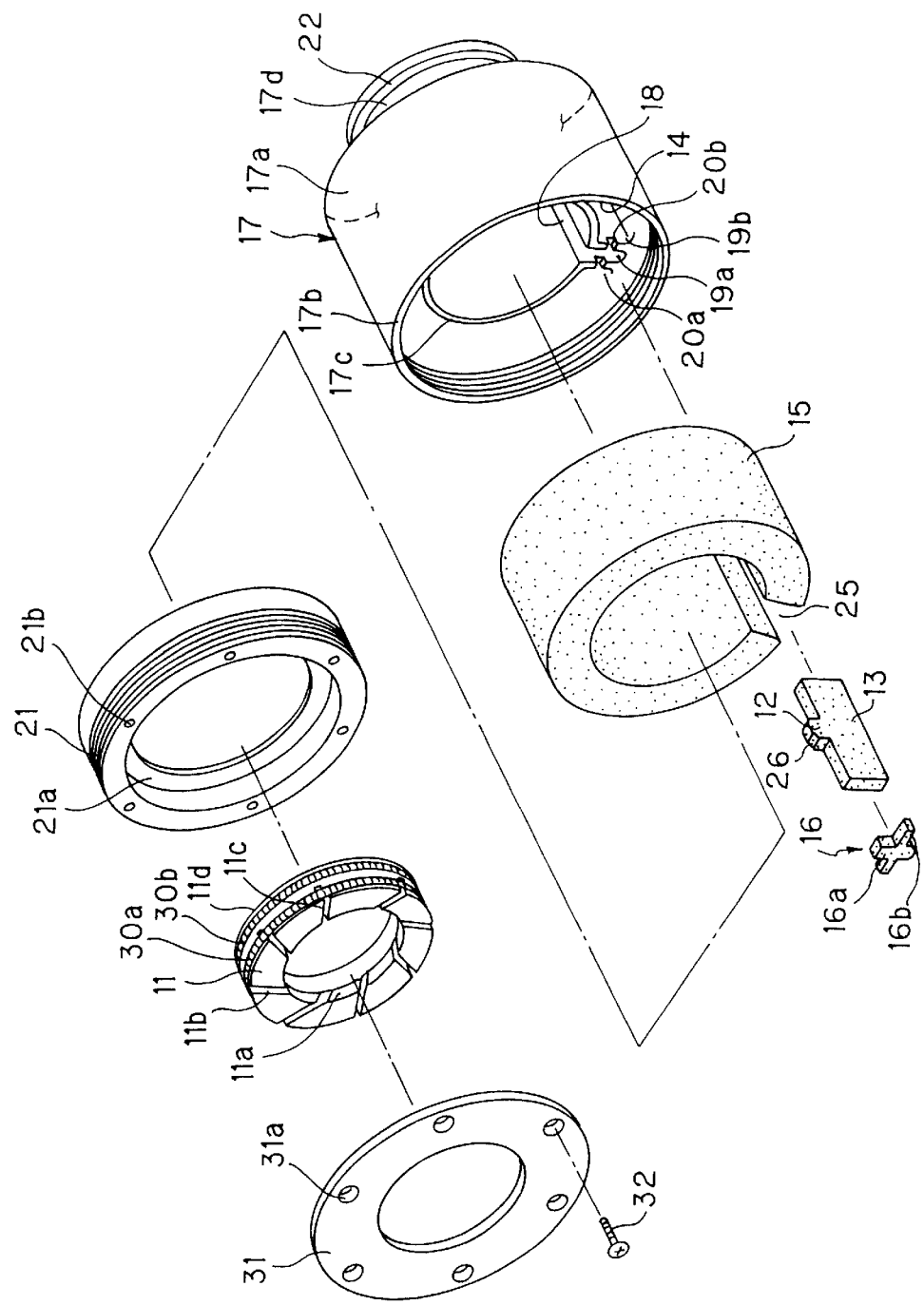
FIG. 2 is an exploded perspective view of the lubricant supply device of the first embodiment of the present invention.

FIG. 2 is an exploded perspective view of the lubricant supply device 10 of the first embodiment of the present invention. The lubricant supply device 10 comprises an application member 13, a lubricant storage member 14, an occlusion member 15 and a joint member 16. The application member 13 has a tongue portion 12, which can come into contact with the ball running groove 2a of the screw shaft 2. The lubricant storage member 14 supplies the lubricant to the application member 13. The occlusion member 15 is received in the lubricant storage member 14. The joint member 16 serves as the control device for controlling an amount of the lubricant supplied from the occlusion member 15 to the application member 13.

As the lubricant storage member 14, a casing 17 having in its inside a lubricant storage chamber is used. The casing 17 comprises a base plate 17a formed into a disc-shape, an outer tube 17b formed on the outer periphery of the base plate 17a so as to extend in the perpendicular direction to the base plate 17a, and an inner tube 17c provided in the inside of the outer tube 17b. The space between the outer tube 17b and the inner tube 17c is used as the lubricant storage chamber. The lubricant storage member 14 has a slit 18 formed so as to locate on the single straight line, which is in parallel with the central axial line of the screw shaft 2. The slit 18 opens toward the screw shaft 2 and is separated from the inside of the lubricant storage member 14. More specifically, the slit 18 is obtained by forming an elongated cut on the inner tube 17c in its longitudinal direction to form the opposite cut edges of the inner tube 17c and forming a pair of partition walls 19a, 19b to connect the above-mentioned opposite cut edges of the inner tube 17c to the outer tube 17b, respectively. The slit 18 opens also at its longitudinal front end, i.e., its opposite end to the base plate 17a. Cut-outs 20a, 20b into which the joint member 16 is to be fitted, are formed in the vicinity of the open end of the slit 18, i.e., the longitudinal front ends of the partition walls 19a, 19b, respectively. The outer tube 17b has on the inner surface of its front end a female-screw portion with which a sealing case 21 is to be engaged. The longitudinal length of the inner tube 17c is shorter than the longitudinal length of the outer tube 17b so as to permit to fit the sealing case 21 into the front end of the outer tube 17b. The base plate 17a has a tubular inlet portion 17d, which is formed on the outer surface of the base plate 17a so as to project in the perpendicular direction thereto. The inlet portion 17d has a groove 22 that is formed on the outer periphery of the inlet portion 17d so as to extend in the peripheral direction thereof. As shown in FIG. 1, the inlet portion 17d can be fitted into a ring-shaped groove 23, which is formed on the flange portion 7 of the nut member 3. The lubricant supply device 10 is firmly held on the nut member 3 by fastening a screw 24, which is screwed in the flange portion 7 of the nut member 3 so as to be movable in the radial direction thereof, to engage the front end of the screw 24 with the groove 22 of the inlet portion 17d.

The occlusion member 15 has a tubular shape, which is adapted for the lubricant storage member 14 so that the occlusion member 15 can be fitted into the lubricant storage member 14. The occlusion member 15 is provided with a slit 25 having the opposite open ends, which extends in the longitudinal direction so as to correspond to the slit of the lubricant storage member 14. As the occlusion member 15, there is used oil absorbent material, which can absorb the lubricant to preserve it. With respect to the oil absorbent material for the occlusion member 15, it is preferable to use fiber-entangled body such as felt having a relatively high porosity in order to preserve a large amount of lubricant. In view of this fact, the combination of rayon and wooly felt is used in the embodiment of the present invention. The combination of rayon and wooly felt is designed so as to prevent the lubricant absorbed by it from moving downward under its gravity.

The joint member 16 for controlling an amount of lubricant supplied from the occlusion member 15 to the application member 13 comprises a main body 16a, which comes into contact with the application member 13, but does not come into contact with the inside of the lubricant storage member 14, and elongated portions 16b, 16b, which are formed integrally with the main body 16a and extend therefrom to reach the inside of the lubricant storage member 14 and come into contact with the occlusion member 15. The main body 16a is formed into a rectangular shape extending vertically and has at its lower end a round portion. The shape of the main body 1a is substantially identical with the cross-sectional shape of the slit 18 so that the main body 16a can be fitted into the front end of the slit 18. The elongated portions extend horizontally from the central portion of the main body 16a. Accordingly, the joint member 16 composed of the main body 16a and the elongated portions 16b, 16b has a cross shape. The elongated portions 16b, 16b are fitted into the cutouts 20a, 20b formed on the partition walls 19a, 19b of the casing 17. The lubricant preserved in the occlusion member 15 is supplied to the application member 13 through the elongated portions 16b, 16b and the main body 16a of the joint member 16. As the joint member 16, there is used oil absorbent material, which can absorb the lubricant to preserve it. With respect to the oil absorbent material for the joint member 16, it is preferable to use fiber-entangled body such as felt having a porosity, which is midway between the porosities of the occlusion member 15 and the application member 13. In view of this fact, wooly felt is used in the embodiment of the present invention.

The application member 13 for applying the lubricant on the ball running groove 2a of the screw shaft 2 is formed into a rectangular shape. The application member 13 has a thickness, which is substantially identical with the width of the slit 18 so that it can be fitted into the slit 18. The height of the application member 13 is substantially identical with the height of the slit 18. The application member 13 is provided on its upper portion with a tongue portion 12 having a rectangular shape, which can come into contact with the ball running groove 2a of the screw shaft 2. In view of the fact that the screw shaft 2 is a single-threaded screw, the number of the tongue portion 12 is one that is identical with the number of the thread groove, i.e., the ball running groove 2a of the screw shaft 2 in the embodiment of the present invention. The tongue portion 12 has a chamfer 26, which can come into contact with the ball running groove having the arcuate cross section. As the application member 13, there is used oil absorbent material, which can absorb the lubricant to preserve it. With respect to the oil absorbent material for the application member 13, it is preferable to use fiber-entangled body such as felt having a relatively low porosity. Wooly felt is used in the embodiment of the present invention. Use of the oil absorbent material such as felt having a relatively low porosity makes it possible to preserve an amount of lubricant, which is required to be applied, in the application member 13 and impart strength, which is sufficient to bear the contact slide with the rolling-member running surface, to the application member 13.

The sealing case 21 for sealing the lubricant storage member 14 is formed into a ring-shape. The sealing case 21 has on its outer peripheral surface a male-screw portion, which can engage with the female-portion formed on the outer tube 17b. The sealing case 21 is provided at its rear and facing the lubricant storage member 14 with an inward flange 21a by which the chamber of the lubricant storage member 14 can be closed. The sealing case 21 has a plurality of female-thread portions 21b, which are formed on its front face at regular intervals in the circumferential direction thereof. Machine screws are fitted into the above-mentioned female-thread portions 21b.

The wiper ring 11 for removing foreign substances, which are attached on the ball running surface of the screw shaft 2, is formed of synthetic resin. The wiper ring 11 has on its inner periphery a projection 11a, which can be inserted into the ball running groove 2a of the screw shaft 2. The wiper ring 11 has slits 11b extending radially inward from the outer periphery of the wiper ring 11. These slits 11b form scraping faces 11c. The edge of the scraping face 11c, which comes into contact with the outer periphery of the screw shaft 2, can remove foreign substances, which are attached on the screw shaft 2, and discharge it outside, thus preventing the foreign substances from coming into the nut member 3. Coil springs 30a, 30b, which are in the form of a ring, are attached on the outer periphery of the wiper ring 11. These springs 30a, 30b permit the wiper ring 11 having a proper resiliency to come into contact with the screw shaft 2 to ensure close contact of the edge of the scraping face 11c with the screw shaft 2. The close contact of the wiper ring 11 with the screw shaft 2 can ensure the sealing condition of the inside of the nut portion 3, thus preventing the lubricant from leaking out. Lubricant returning slits (not shown) may be formed on the end surface 11d of the wiper ring 11, which faces the nut member 3, so as to extend radially. The lubricant returning slits thus formed can positively trap and scoop up a very small amount of lubricant, which may come into the gap between the wiper ring 11 and the screw shaft 2, so as to return the thus scooped lubricant to the inside of the nut member 3.

A cover 31 for retaining the wiper ring 11 in the sealing case 21 is formed of a disc-shaped plate having an opening into which the screw shaft 2 can be inserted. The cover 31 has machine screw holes 31a formed thereon at regular intervals in the circumferential direction. The cover 31 is fixed to the sealing case 21 by fastening machine screws 32, which pass through the above-mentioned machine screw holes 31a and are fitted into the female-thread portions 21b of the sealing case 21.

Figure 3:
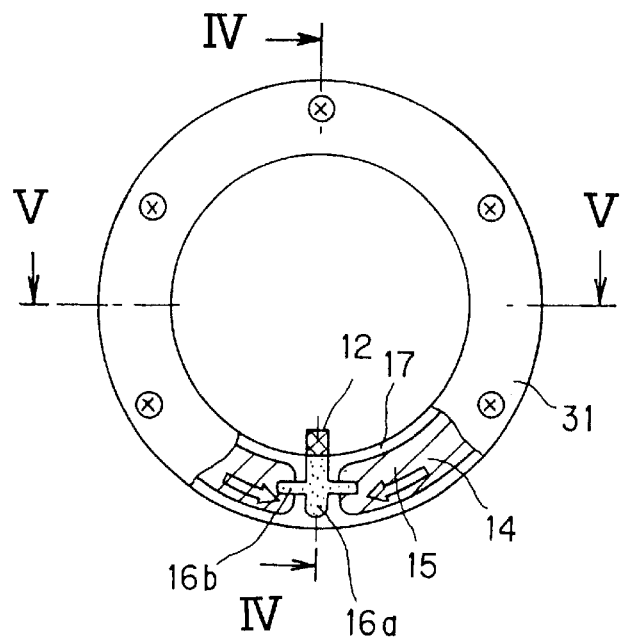
FIG. 3 is a side view of the lubricant supply device of the first embodiment of the present invention, which is viewed from its cover side.
Figure 4:
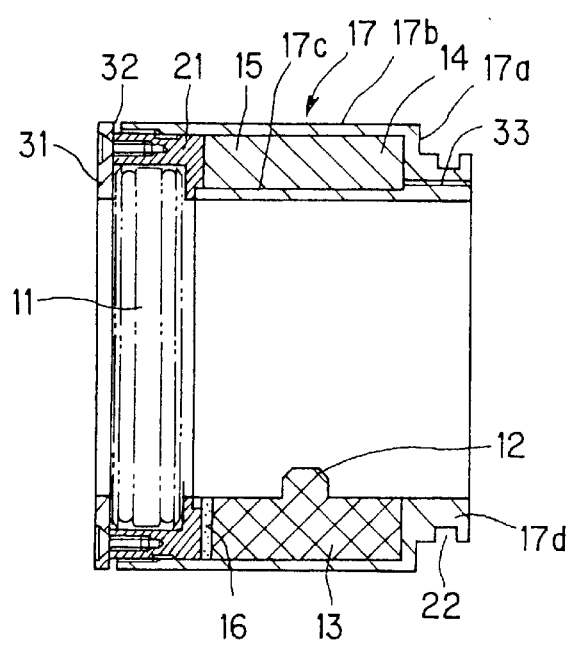
FIG. 4 is a cross-sectional view cut along the line IV—IV in FIG. 3.
Figure 5:
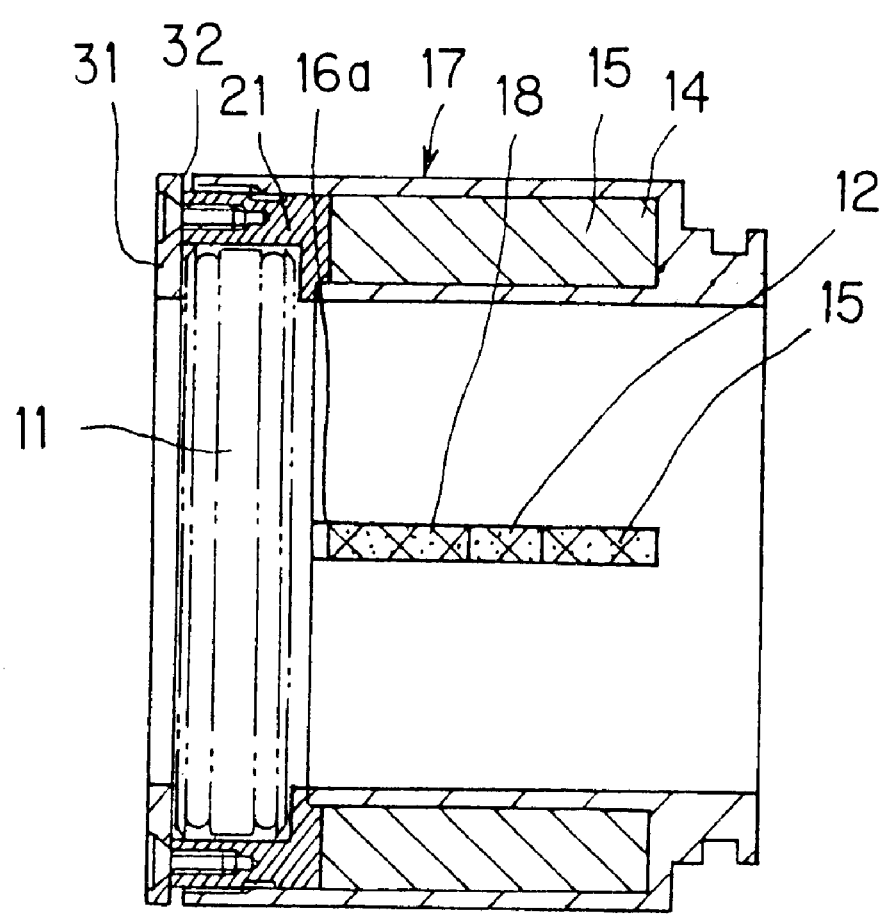
FIG. 5 is a cross-sectional view cut along the line V—V in FIG. 3.

FIGS. 3 to 5 show the lubricant supply device 10 of the present invention in an assembled state. FIG. 3 is a side view of the device, which is viewed from the cover 31 side, FIG. 4 is a cross-sectional view cut along the line IV—IV in FIG. 3 and FIG. 5 is a cross-sectional view cut along the line V—V in FIG. 3.

As shown in FIGS. 3 to 5, the lubricant storage member 14 receives the occlusion member 15, which absorbs adequately the lubricant. The application member 13, which absorbs adequately the lubricant, is fitted into the slit 18. The tongue portion 12 of the application member 13, which is fitted into the slit 18 in this manner, projects toward the center of the casing 17. The joint member 16 is fitted to the open end of the slit 18. The main body 16a of the joint member 16 comes into contact with the application member 13, but does not come into contact with the occlusion member 15. The elongated portions 16b, 16b come into contact with the occlusion member 15.

After the completion of fitting the occlusion member 15, the joint member 13 and the application member 13 in the casing 17, the sealing case is screwed into the casing 17 so as to ensure the sealed condition of the lubricant storage member 14. Elastomer serving as a sealing agent, which can be obtained by the two-color forming method, is provided on the contact surface of the sealing case 21 and the casing 17. The lubricant storage member 14 is almost completely sealed in this manner.

The wiper ring 11 is placed in the sealing case 21. The cover 31 is fixed to the sealing case 21 by the machine screws 32, with the result that the wiper ring 11 is held in a stationary state. After the completion of the mounting step of the lubricant supply device 10 on the nut member 3, the tongue portion 12 projecting toward the center of the casing 17 comes into contact with the ball running groove 2a of the screw shaft 2 under a prescribed pressure. The tip end of the tongue portion 12 always preserves the lubricant adequately by capillary action. However, no ooze of the lubricant occurs due to the retentive function given by its surface tension. A relative rotation of the screw shaft 2 to the nut member 3 causes the lubricant to be applied on the ball running groove 2a from the tongue portion 12 so as to form an oil film on the ball running groove 2a.

When the lubricant is applied on the ball running groove 2a from the tongue portion 12 of the application member in this manner, the lubricant absorbed by the application member moves toward the tongue portion 12 by capillary action. The occlusion member 15 preserves a large amount of lubricant. The lubricant absorbed by the occlusion member 15 is supplied through the joint member 16 to the application member 13 by capillary action, according as the amount of lubricant absorbed by the application member 13 gradually decreases. As a result, the application member 13 can always absorb a constant amount of lubricant, thus making it possible to stably supply the prescribed amount of lubricant to be applied on the screw shaft 2 from the application member 13. Utilization of the capillary action makes it possible to supply surely an extremely slight required amount of the lubricant without causing discontinuance of supply.

The tongue portion 12 of the lubricant supply device 10, which is mounted on the nut member 3, moves along the ball running groove 2a along with the rotation of the screw shaft 2. The number of the tongue portion is identical with the number of the rolling-member running surface. Accordingly, the spiral rolling-member running surface of the screw shaft 2 can be lubricated over its entire length. The tongue portion 12 locates on the single straight line, which is in parallel with the central axial line of the screw shaft 2. Accordingly, it is possible to collect the lubricant supplied from the occlusion member 15 in the single place corresponding to the above-mentioned single straight line, as shown in an arrow in FIG. 3, so as to apply effectively the lubricant on the ball running groove 2a. When the ball screw especially has the stationary nut member, the arrangement of the tongue portion 12 in the lower position of the occlusion member 15 causes the lubricant to gather in the single lower place, thus providing more effective results.

The joint member 16 controls an amount of lubricant supplied from the occlusion member 15 to the application member 13. The optimum determination of the shapes of the elongated portions 16b and the main body 16a of the joint member 16, a contact area of the elongated portions 16b with the occlusion member 15 and the contact area of the main body 16a with the application member 13 makes it possible to supply the lubricant from the occlusion member 15 to the application member 13 in a properly controlled manner.

The casing 17 has an air vent 33 as shown in FIG. 4, which communicates with the inside of the lubricant storage member 14 so as to keep the internal pressure of the lubricant storage member 14 identical to the atmospheric pressure. Consequently, the movement of the lubricant from the occlusion member 15 to the application member 13 depends on the capillary action of the lubricant in the fiber-entangled body. Arrangement of the application member 13 in the lower portion of the lubricant storage member 14 causes the lubricant absorbed by the occlusion member 15 to move toward the application member 13 under the gravity of the lubricant. When the lubricant is consumed in its almost whole supplied amount after a lapse of a prescribed period of time, it is necessary to supply the lubricant from outside to the occlusion member 15. In such a case, it is possible to supply the lubricant to the inside of the casing 17 through the air vent 33 formed on the casing 17.

The edges of the scraping faces 11c of the wiper ring 11 slide on the screw shaft 2, while coming into contact with the ball running groove 2a and the outer peripheral surface of the screw shaft 2, with the result that dust attached on the screw shaft 2 can be removed. The wiper ring 11 ensures the sealing condition of the inside of the nut portion 3, in which the lubricant is preserved, thus making it possible to lubricate the screw shaft 2 for a long period of time. When the wiper ring 11 has the above-described lubricant returning slits (not shown), it is possible to positively trap and scoop up a very small amount of lubricant, which may come into the gap between the wiper ring 11 and the screw shaft 2, so as to return the thus scooped lubricant to the inside of the nut member 3. Accordingly, the screw shaft 2 can be lubricated for a longer period of time.

Figure 6:
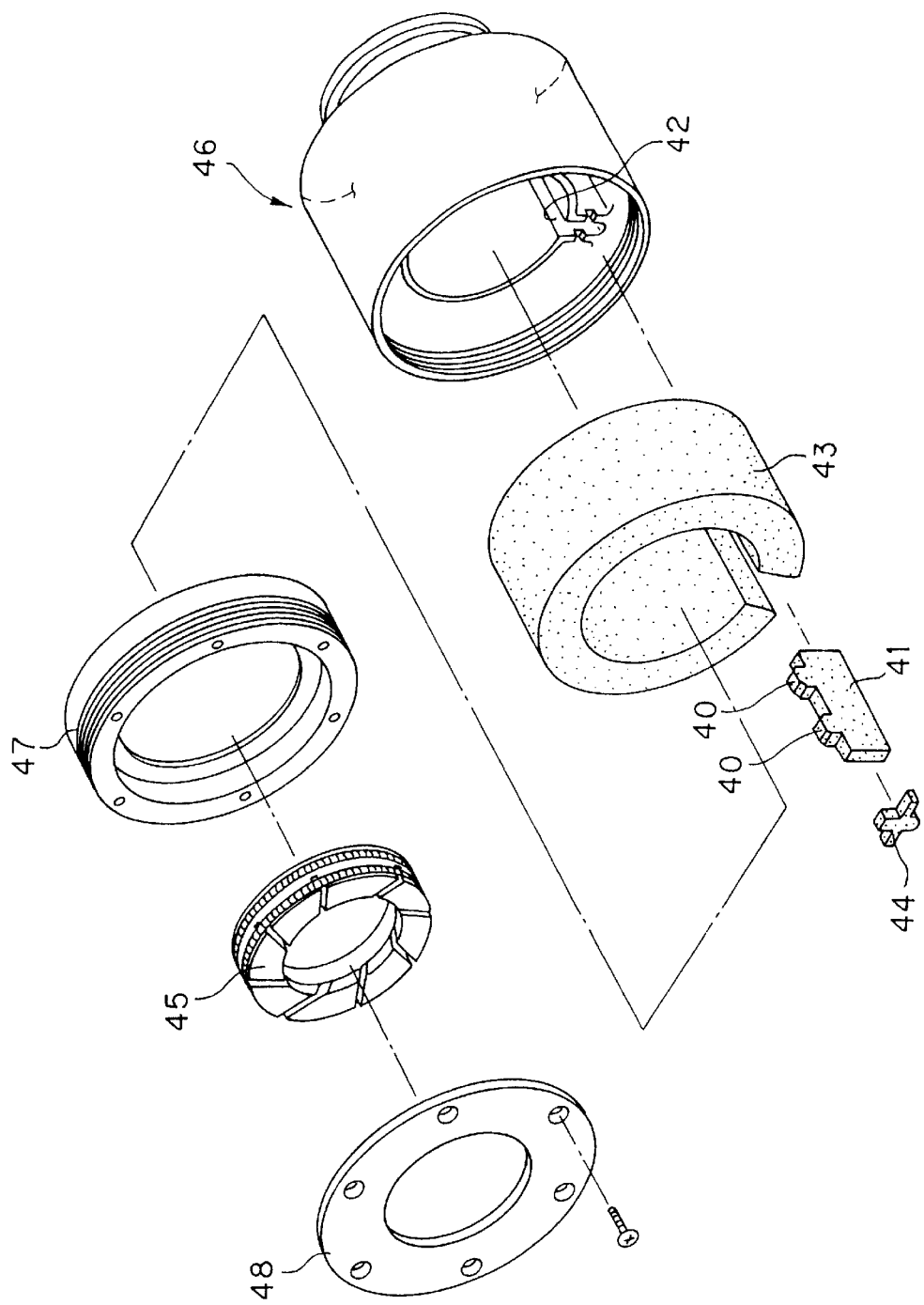
FIG. 6 is an exploded perspective view of the lubricant supply device of the second embodiment of the present invention.

FIG. 6 shows the lubricant supply device of the second embodiment of the present invention. The lubricant supply device of this embodiment is used in a case where the screw shaft has two ball running grooves 2a. The device comprises an application member 41, a lubricant storage member 42, an occlusion member 43 and a joint member 44. The application member 41 has tongue portions 40, which can come into contact with the ball running grooves 2a of the screw shaft 2. The lubricant storage member 42 supplies the lubricant to the application member 41. The occlusion member 43 is received in the lubricant storage member 42. The joint member 44 controls an amount of the lubricant supplied from the occlusion member 43 to the application member 41. The lubricant supply device of the second embodiment is also provided with the same wiper ring 45 as in the first embodiment, which can discharge outside foreign substances attached on the surface of the screw shaft 2. A casing 46, a sealing case 47 and a cover 47 have the same structures as those of the lubricant supply device of the first embodiment of the present invention, respectively.

In the lubricant supply device of the second embodiment of the present invention, two tongue portions 40, the number of which is identical with the number of the ball running grooves 2a, are provided along the single straight line that is in parallel with the central line of the screw shaft 2. The tongue portions 40 are spaced from each other by a distance, which is identical with the pitch of the ball running groove 2a, so that they are fitted into the adjacent ball running grooves 2a. The application member has the same structure as that of the application member of the lubricant supply device of the first embodiment of the present invention, excepting that the two tongue portions 40 are formed.

The lubricant supply device of the second embodiment of the present invention has the two tongue portions 40, which locate along the single straight line that is in parallel with the central line of the screw shaft 2, so as to correspond to the ball running grooves 2a. Accordingly, it is possible to apply the lubricant on the ball running grooves 2a of the screw shaft 2 over the entirety, irrespective of the number of the ball running grooves 2a of the screw shaft 2. The tongue portions 40 gather on the single straight line that is in parallel with the central line of the screw shaft 2, thus making it possible to gather the lubricant absorbed by the occlusion member 43 in the single place so as to apply it effectively on the ball running grooves 2a.

The number of the tongue portions 40 is not limited only to the same number as that of the ball running grooves 2a and may be larger than the latter.

In the ball screw described above, the return pipe 5 scoops up the balls 4 . . . 4 running in the ball running groove 2a of the screw shaft 2 and returns them to the different position in the ball running groove 2a, which locates away from the scooping position by prescribed pitches of the screw shaft 2. There may be adopted a specific structure that the nut member 3 has deflectors (not shown), which can scoop up the balls 4 . . . 4. More specifically, it is possible to deflect the balls 4 . . . 4 running in the ball running groove 2a of the screw shaft 2 from the ball running groove 2a by means of the deflector and return them beyond the large diameter portion of the screw shaft 2 to the portion of the ball running groove 2a, which locates away from the scooping position by a pitch of the screw shaft 2. The present invention may be applied to a so-called "side-cover type" ball screw (not shown) in which the nut member 3 is composed of a nut body having ball running grooves and side-covers fitted on the opposite ends of the nut body, ball return passages are formed in the nut body and a connecting passage is formed in each of the side covers so as to connect the ball running groove and the ball return passage with each other.

The balls are used as the rolling members in each of the first and second embodiments of the present invention. Rollers may be used as the rolling members.

According to the present invention as described in detail, the lubricant supply device comprises the application member for applying the lubricant on the screw shaft, said application member having at least one tongue portion, which is capable of coming into contact with at least one of rolling-member running surface of the screw shaft, a number of said at least one tongue portion being identical with or larger than the number of the rolling-member running surface; a lubricant storage member for supplying the lubricant to the application member; and a control device for controlling an amount of the lubricant supplied from the lubricant storage member to the application member.

The relative rotation of the screw shaft to the nut member is made so that the lubricant is applied from the tongue portion of the application member on the surface of the rolling-member-running surface of the screw shaft. The control device controls an amount of lubricant supplied from the lubricant storage member to the application member. Consequently, there is no serious change in an amount of lubricant supplied from the lubricant storage member to the application member even after a lapse of time so that a prescribed amount of lubricant can always be applied from the application member on the screw shaft. The tongue portion, which is mounted on the nut member, can move along the spiral rolling-member-running surface along with the relative rotation of the nut member to the screw shaft. The number of the tongue portion is identical with or larger than the number of the rolling-member running surface. Accordingly, the spiral rolling-member running surface of the screw shaft can be lubricated over its entire length, irrespective of the number of the rolling-member running surface. When there is adopted a structure that a plurality of tongue portions are provided as the at least one tongue portion, the plurality of tongue portions locating along a single straight line, which is in parallel with the central axial line of the screw shaft, it is possible to collect the lubricant supplied from the lubricant storage member in the single place, irrespective of the number of the rolling-member running surface, so as to apply effectively the lubricant on the rolling-member running surface. When the rolling-member screw apparatus especially has the stationary nut member, the arrangement of the tongue portions in the lower position of the lubricant storage member causes the lubricant to gather in the single lower place under the gravity of the lubricant, thus providing more effective results.

What is claimed is:

1. A lubricant supply device, which is to be fitted to a nut member engaging with a screw shaft through rolling members to supply lubricant to said screw shaft along with a relative rotational motion of said nut member to said screw shaft and comprising:
   - a single elongated application member disposed in a single position on a periphery of said screw shaft so as to extend with its length disposed in a longitudinal direction of said screw shaft along a straight line parallel with a central axial line of said screw shaft, for applying the lubricant on at least one rolling-member running surface of said screw shaft, said application member having at least one tongue portion, which is capable of coming into contact with said at least one rolling-member running surface of said screw shaft to apply the lubricant thereon;
   - a lubricant storage member for supplying the lubricant to said application member; and
   - a control device for controlling an amount of the lubricant supplied from said lubricant storage member to said application member.

2. The device as claimed in claim 1, wherein:
   - said lubricant storage member is formed into a tubular shape so that said screw shaft is inserted in said lubricant storage member without causing restriction of the motion of said screw shaft;
   - said lubricant storage member has a slit, which is separated from an inside of said lubricant storage member, said slit opening toward said screw shaft and extending along said single straight line; and
   - said application member is fitted into said slit.

3. The device as claimed in claim 2, wherein:
   - the inside of the lubricant storage member communicates with said slit at an end thereof in a longitudinal direction;
   - said application member is formed of oil absorbent material, which can absorb the lubricant to preserve the same, into a plate-shape, said application member being fitted into said slit so as not to come into contact with the inside of said lubricant storage member;
   - said control device comprises a joint member, which is formed of the oil absorbent material to absorb the lubricant to carry the same, said joint member comprising a main body, which comem into contact with said application member at said one end of said slit, but does not come into contact with the inside of said lubricant storage member, and elongated portions which extend from said main body to reach the inside of said lubricant storage member.

4. The device as claimed in claim 3, wherein:
   - said lubricant storage member has an occlusion member received therein, which is formed of the oil absorbent material so as to absorb the lubricant to preserve the same; and
   - porosities of the oil absorbent materials of said occlusion member, said joint member and said application member are determined to be larger in this order.

5. The device as claimed in claim 1, there being a plurality of tongue portions on said application member, each in contact with a separate said rolling member running surface of said screw shaft.

* * * * *